(12) United States Patent
Hu

(10) Patent No.: US 12,534,275 B2
(45) Date of Patent: Jan. 27, 2026

(54) DISPENSING MECHANISM OF DETERGENT CONTAINER

(71) Applicant: CIRCL, INC., Hayward, CA (US)

(72) Inventor: Chris Hui Chuan Hu, New Taipei (TW)

(*) Notice: Subject to any disclaimer, the term of this patent is extended or adjusted under 35 U.S.C. 154(b) by 232 days.

(21) Appl. No.: 18/435,099

(22) Filed: Feb. 7, 2024

(65) Prior Publication Data

US 2025/0250078 A1    Aug. 7, 2025

(51) Int. Cl.
| | |
|---|---|
| *B65D 25/42* | (2006.01) |
| *B65D 17/28* | (2006.01) |
| *B65D 17/32* | (2006.01) |
| *B65D 47/36* | (2006.01) |
| *B65D 77/20* | (2006.01) |

(52) U.S. Cl.
CPC ............ *B65D 47/36* (2013.01); *B65D 17/32* (2018.01); *B65D 17/4014* (2018.01); *B65D 25/42* (2013.01); *B65D 77/2024* (2013.01)

(58) Field of Classification Search
CPC .... B65D 47/36; B65D 25/42; B65D 17/4014; B65D 77/2024; B65D 17/32
USPC .................................................... 222/153.06
See application file for complete search history.

(56) References Cited

U.S. PATENT DOCUMENTS

| | | | | |
|---|---|---|---|---|
| 5,255,804 | A * | 10/1993 | Butterbrodt ......... | B65D 1/0238 215/901 |
| 5,425,920 | A * | 6/1995 | Conti .................... | B01L 3/569 422/537 |
| 5,950,876 | A * | 9/1999 | McLelland .......... | B65D 47/063 222/541.9 |
| 6,679,403 | B2 * | 1/2004 | Goodall ............. | B65D 47/0804 222/481.5 |
| 8,397,927 | B2 * | 3/2013 | Krebs .................. | B65D 51/228 215/48 |
| 10,464,711 | B2 * | 11/2019 | Tsui .................... | A47J 27/21008 |
| 11,155,383 | B2 * | 10/2021 | Brooks .............. | B65D 43/0231 |
| 2015/0041478 | A1 * | 2/2015 | Abrams .............. | A47J 41/0022 220/592.16 |
| 2015/0251795 | A1 * | 9/2015 | Tsui ..................... | B65D 1/0292 215/379 |
| 2015/0251808 | A1 * | 9/2015 | Tsui ...................... | D06F 95/002 211/41.6 |
| 2018/0194517 | A1 * | 7/2018 | Brooks .............. | B65D 81/3865 |
| 2019/0119000 | A1 * | 4/2019 | Tsui .................... | B29D 22/003 |
| 2025/0250072 | A1 * | 8/2025 | Hu ........................ | B65D 37/00 |

* cited by examiner

*Primary Examiner* — Paul R Durand

(57) ABSTRACT

A detergent container includes a reservoir including a top dispensing part, an intermediate corrugated part, and a bottom edge part. The reservoir is tapered upward. A middle of the dispensing part is provided with a reclosable opening. The reclosable opening is covered by a folding plate. The folding plate is formed with an edge of the reclosable opening. The folding plate includes a first part and a second part. The first part is formed with a column having a half-round section. The column includes a flat surface and an arc surface. The first part is provided with a first fold line between the arc surface and the edge of the reclosable opening. The second part is provided with a second fold line between the flat surface and the edge of the reclosable opening. An edge of the dispensing part is provided with a baffle having an arc section.

8 Claims, 8 Drawing Sheets

DISPENSING MECHANISM OF DETERGENT CONTAINER

FIELD OF THE INVENTION

The invention relates to containers and more particularly to a detergent container including a dispensing mechanism having improved characteristics.

BACKGROUND OF THE INVENTION

Conventionally, a bottle is filled with a detergent. Top of the bottle is provided with a screw cap closure. The detergent is poured out of an opening of the bottle for cleaning purposes. However, weight of the conventional bottle is relatively heavy. Further, its transportation cost is relatively high. In addition, it can be inconvenient to use.

Thus, the need for improvement still exists.

SUMMARY OF THE INVENTION

It is therefore one object of the invention to provide a detergent container comprising a reservoir including a dispensing part disposed on a top, an intermediate corrugated part, and a bottom edge part disposed on a bottom wherein a diameter of the dispensing part is less than each of a diameter of the corrugated part and a diameter of the bottom edge part so that the reservoir is tapered from bottom to top; and a protective film attached to the bottom edge part; wherein a middle of the dispensing part is provided with a reclosable opening, the reclosable opening is covered by a folding plate, the folding plate is formed with an edge of the reclosable opening, and the folding plate frictionally fits within the reclosable opening to provide reclosure of the reclosable opening, the folding plate includes a first part and a second part, the first part is formed with a column having a half-round section, the column includes a flat surface and an arc surface, the flat surface is located at a middle of the reclosable opening, the first part is provided with a first fold line between the arc surface and the edge of the reclosable opening, the second part is provided with a second fold line between the flat surface and the edge of the reclosable opening, an edge of the dispensing part is provided with a baffle having an arc section, and a notch is provided through the baffle, the notch is disposed relative to a position of the first fold line, and allows the column to pass through the notch, thereby enabling full range of movement of the column during opening. Further a diameter of the column and a width of the notch are designed such as to provide a frictional fit between the column and the notch, whereby the column is removably retained by notch during opening.

The invention has the following advantages and benefits in comparison with the conventional art:

Convenient opening: the column can be manually pulled toward the notch to pull up the folding plate and open the reclosable opening prior to a detergent flowing out of the reclosable opening for cleaning purposes. After use, the column can be manually pushed away from the notch to push down the folding plate and close the reclosable opening.

Detergent leak prevention: after use, the column may be pushed away from the notch to push down the folding plate so that the folding plate may close the reclosable opening again. Any remaining detergent in the reservoir is sealed by the folding plate and the protective film so that the detergent is kept in the reservoir and prevented from leaking, thereby reducing waste. The detergent is highly concentrated, enabling a relatively small overall container size, and with the higher viscosity associated with highly concentrated liquids, further deters likelihood of leaking through the reclosable opening.

Light weight and reduced transportation costs: the detergent container is made of environmentally friendly and recyclable materials, and it does not use a separate closure. The detergent container is relatively small and light weight, when compared to conventional containers. When empty, bulk quantities of containers can be nested by inserting the narrower top end into the wider bottom end, and when filled, bulk quantities can be nested in alternating top-to-bottom and side-by-side orientations, thereby achieving further reduction of transportation costs and reducing carbon emissions from transportation. Likewise, an end-user will also find the small detergent container to be easy to individually transport, store, and dispose of or recycle.

The above and other objects, features and advantages of the invention will become apparent from the following detailed description taken with the accompanying drawings.

DETAILED DESCRIPTION OF THE INVENTION

Figure 1:
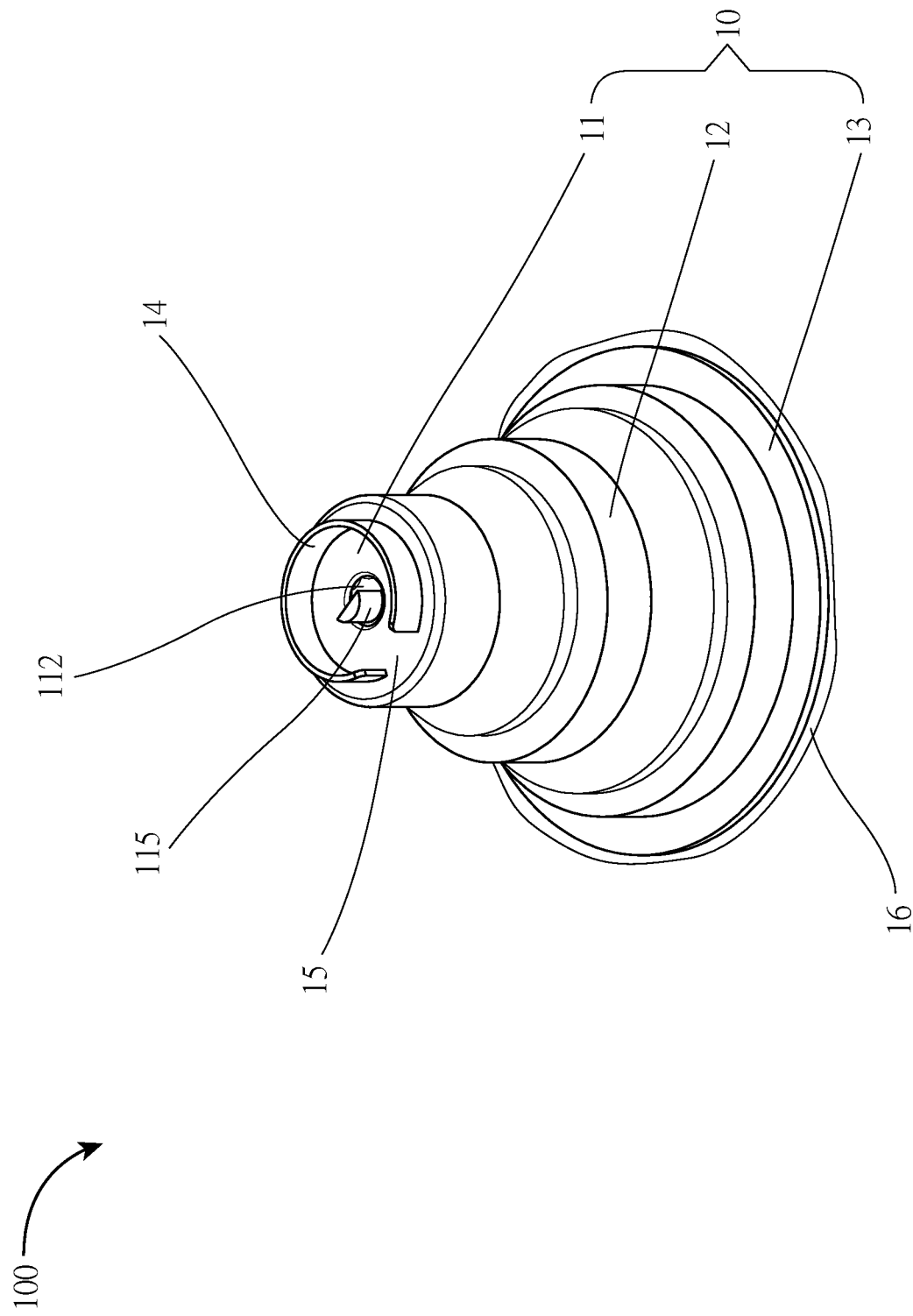
FIG. 1 is a perspective view of a detergent container incorporating a dispensing mechanism of the invention.
Figure 2:
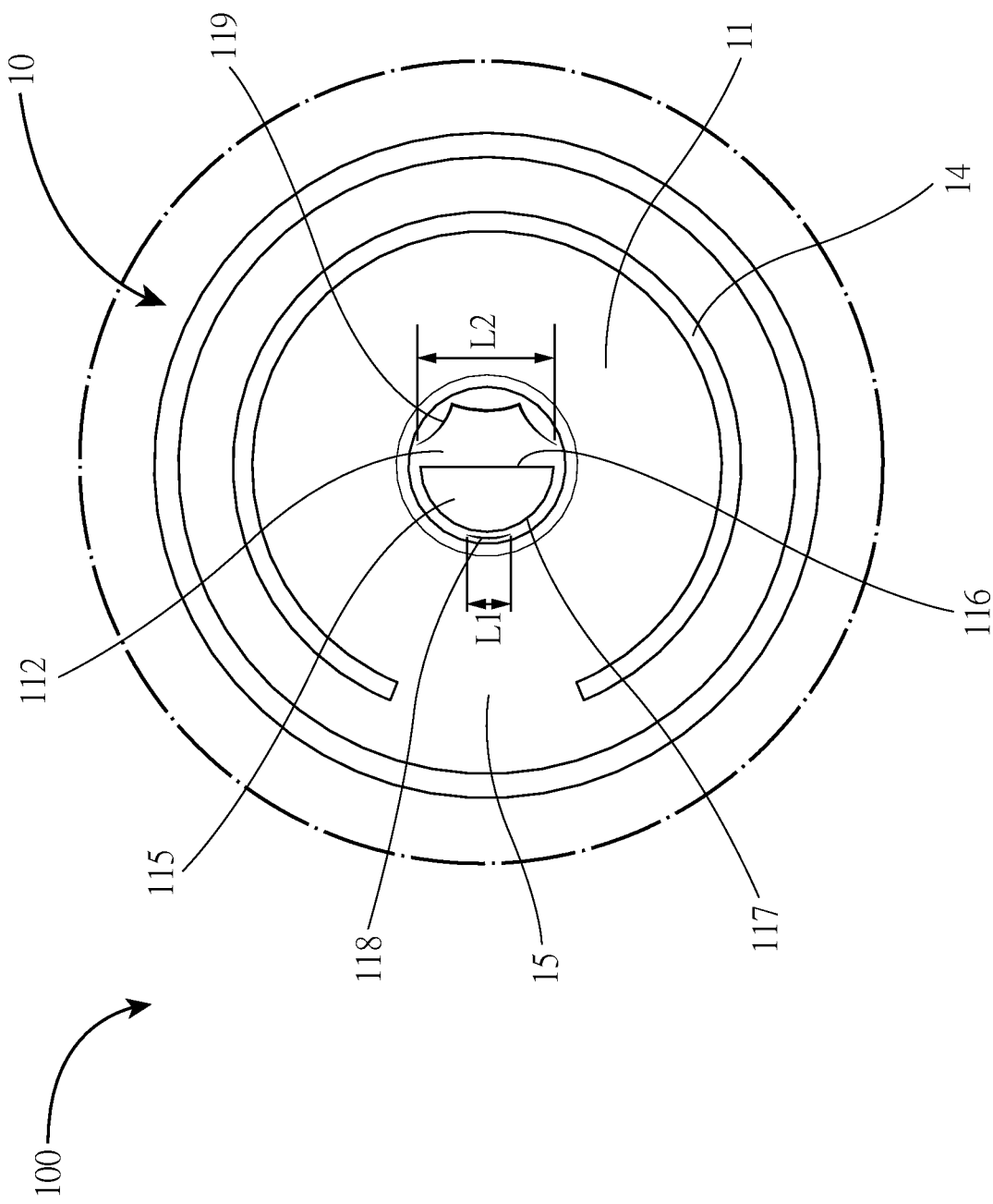
FIG. 2 is a top view of the detergent container.
Figure 3:
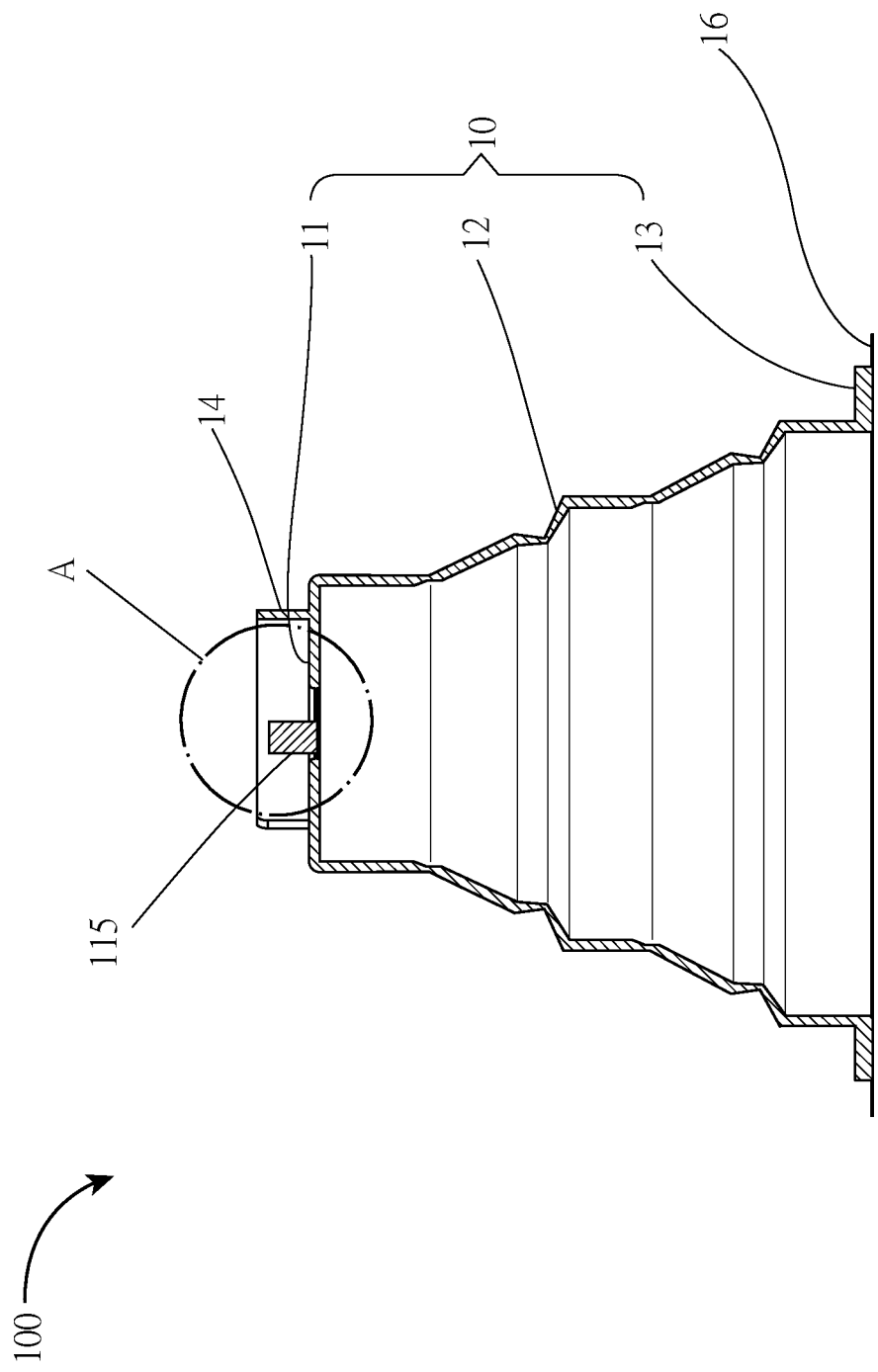
FIG. 3 is a longitudinal sectional view of the detergent container.
Figure 4:
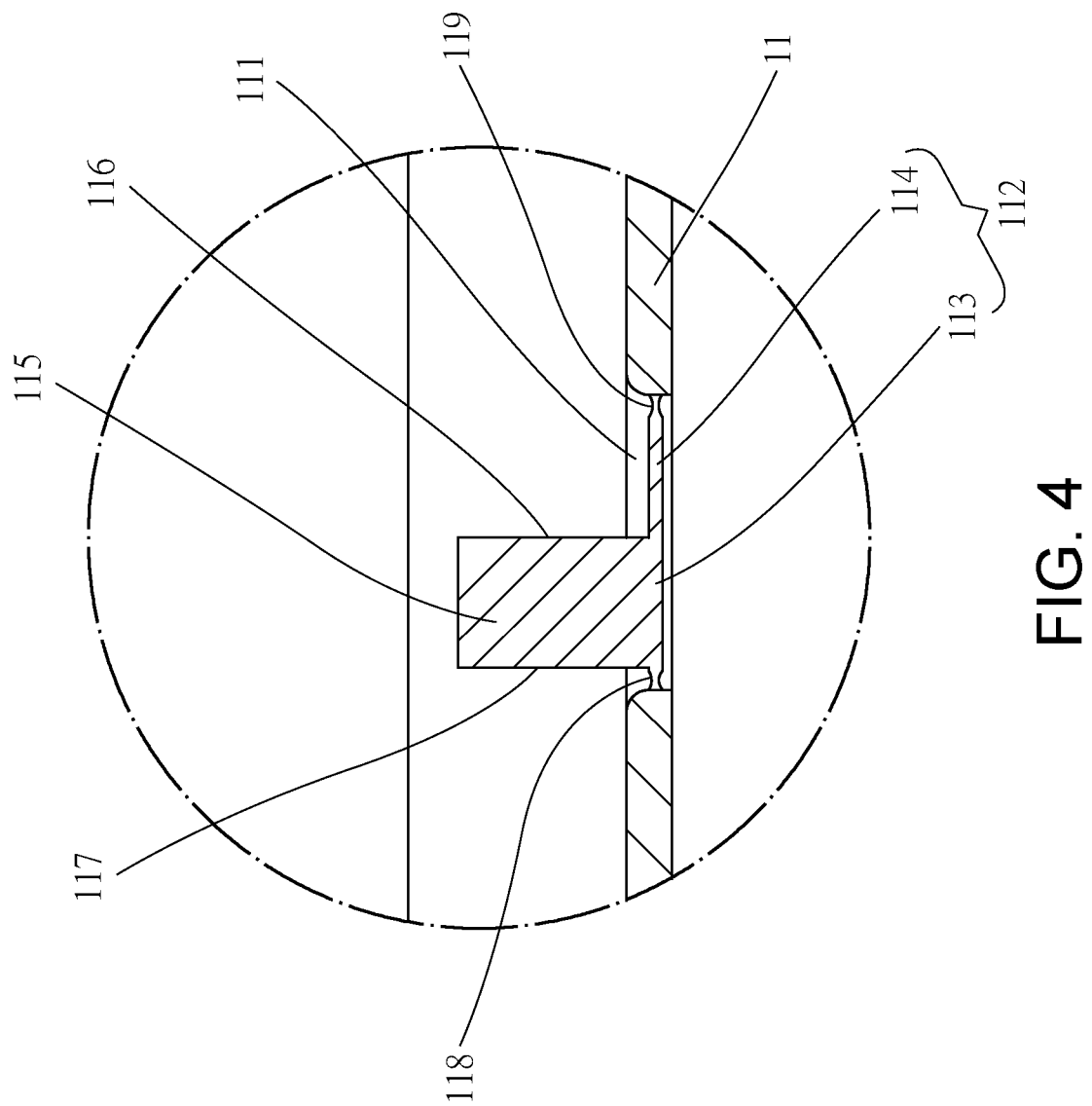
FIG. 4 is a detailed view of the area in a circle A of FIG. 3.
Figure 5:
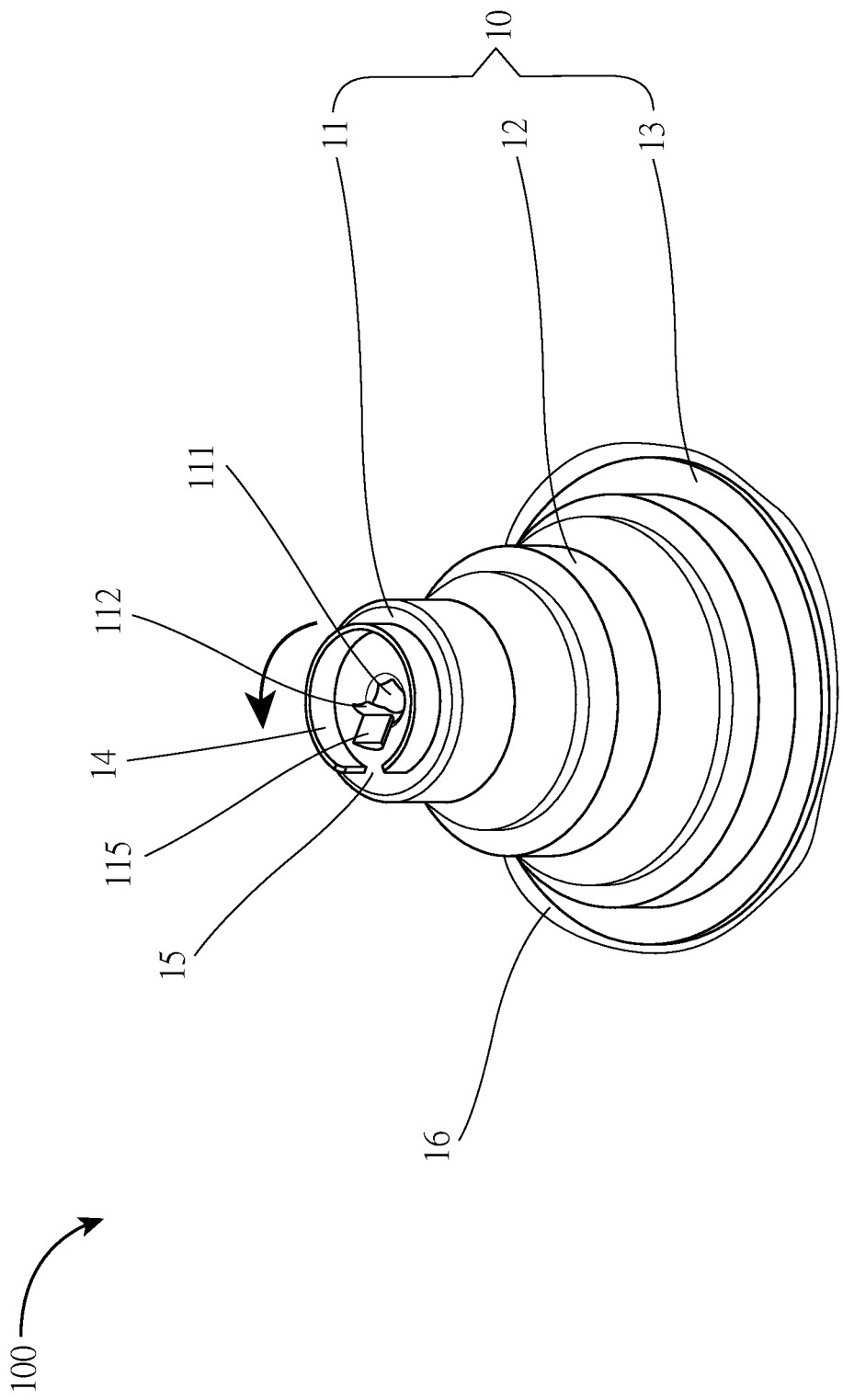
FIG. 5 is a view similar to FIG. 1 showing a reclosable opening being open.
Figure 6:
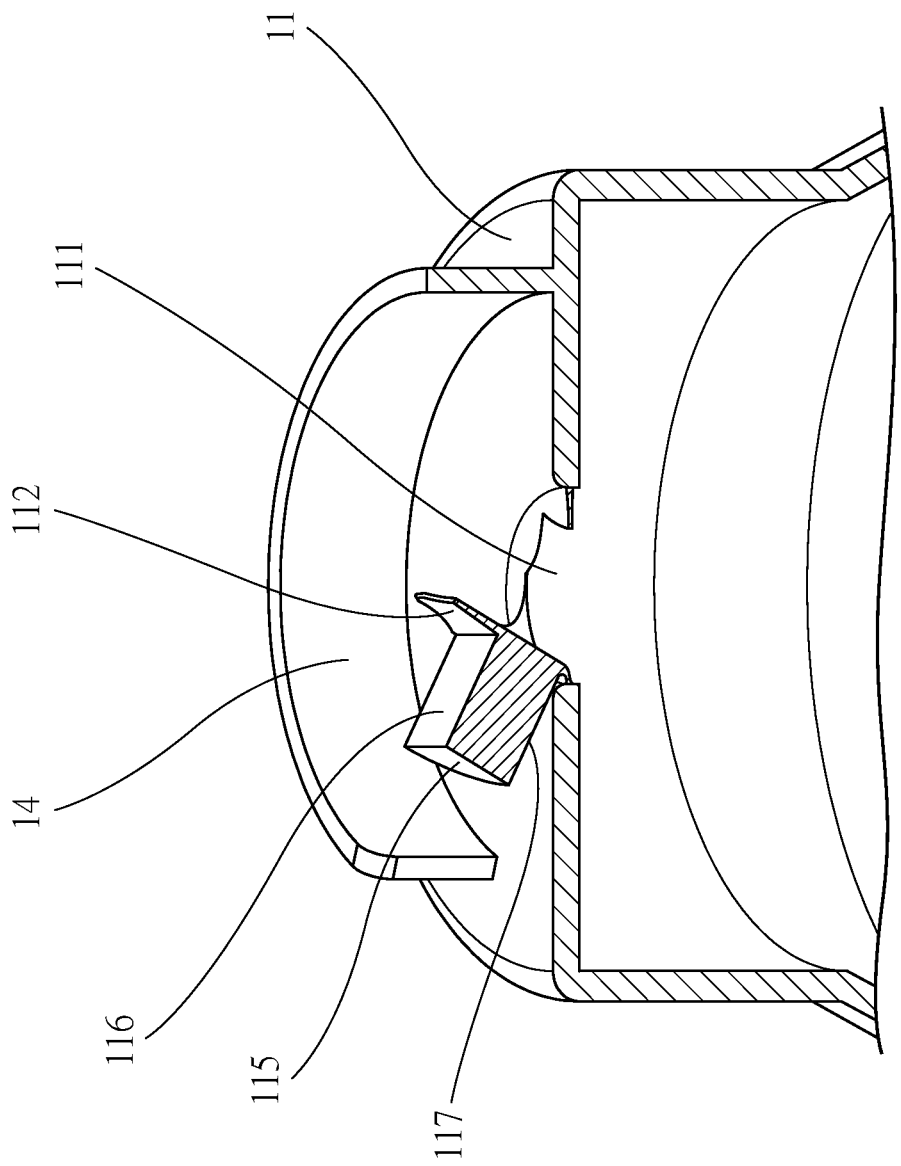
FIG. 6 is a longitudinal sectional view of an upper portion of the detergent container of FIG. 5.
Figure 7:
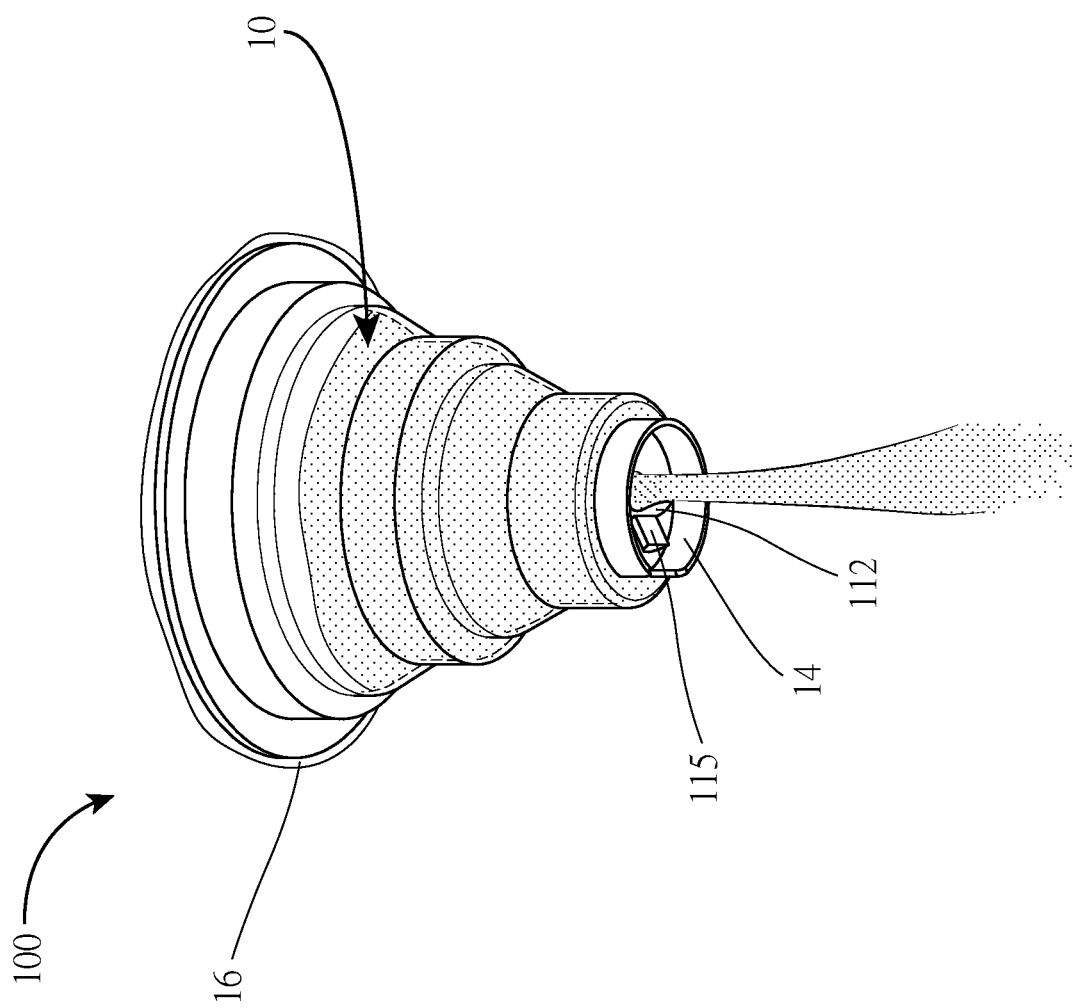
FIG. 7 is a perspective view of the inverted detergent container showing detergent flowing out of the reclosable opening.

Referring to FIGS. 1 to 8, a detergent container 100 incorporating a dispensing mechanism according to the invention comprises the following components as discussed in detail below.

A reservoir 10 is made of environmentally friendly and recyclable material. The reservoir 10 is filled with a detergent. The reservoir 10 comprises a dispensing part 11, a corrugated part 12, and a bottom edge part 13. A diameter of the dispensing part 11 is less than each of a diameter of the corrugated part 12 and a diameter of the bottom edge part 13 so that the reservoir 10 is tapered from bottom to top. The dispensing part 11 is provided on a top of the reservoir 10. The middle of the dispensing part 11 is provided with a reclosable opening 111. The reclosable opening 111 is covered by a folding plate 112. The folding plate 112 is frangible and formed with an edge of the reclosable opening 111. The folding plate 112 includes a first part 113 and a second part 114. The first part 113 is formed with a column 115 having a half-round section. The column 115 includes a flat surface 116 and an arc surface 117. The flat surface 116 is located at a middle of the reclosable opening 111. The first part 113 is provided with a first fold line 118 between the arc surface 117 and the edge of the reclosable opening 111. The first fold line 118 has a first length L1. The second part 114 is provided with a second fold line 119 between the flat surface 116 and the edge of the reclosable opening 111. The second fold line 119 has a second length L2. The second length L2 is greater than the first length L1. In the invention, each of a thickness of the dispensing part 11 and a thickness of the folding plate 112 is greater than each of a thickness of the first fold line 118 and a thickness of the second fold line 119. The thickness of the dispensing part 11 is greater than the thickness of the folding plate 112. In addition, an edge of the dispensing part 11 is provided with a baffle 14 having an arc section. A notch 15 is provided through the baffle 14. The notch 15 is disposed relative to a position of the first fold line 118. The baffle 14 and the reclosable opening 111 are spaced at an appropriate distance. In the invention, a height of the baffle 14 is greater than a height of the column 115 to protect the column 115 from being inadvertently bent and unintentionally opening the folding plate 112. The corrugated part 12 is provided between the dispensing part 11 and the bottom edge part 13. In addition, the bottom edge part 13 is provided on a bottom of the reservoir 10. The bottom edge part 13 is provided with a protective film 16.

The optimum thickness of material depends on selected material type and location on the detergent container 100. Generally speaking, thicknesses between 0.006 inch to 0.016 inch has been found to be effective for a range of injection molding materials including polyolefin such as polyethylene, polypropylene, other semi-rigid resins, or other semi-elastic resins.

As shown in FIGS. 4 to 7 specifically, when the invention is used, a user may pull the column 115 toward the notch 15 with respect to the first fold line 118. As such, the second part 114 pivots to open the second fold line 119, i.e., the reclosable opening 111 being open. Thus, when the detergent container 100 is inverted, the detergent in the reservoir 10 can flow out of the reclosable opening 111 for use in cleaning applications.

After use, the column 115 may be pushed away from the notch 15 to push down the folding plate 12 so that the folding plate 112 may close the reclosable opening 111 again. Any remaining detergent in the reservoir 10 is sealed by the folding plate 112 and the protective film 16 so that the detergent is kept in a vacuum in the reservoir 10 and prevented from leaking, thereby reducing waste.

It is worth mentioning that the detergent container 100 is made of environmentally friendly and recyclable materials. It uses less material than conventional detergent containers due to its small size. Further, it is light weight and can be easily transported.

Figure 8:
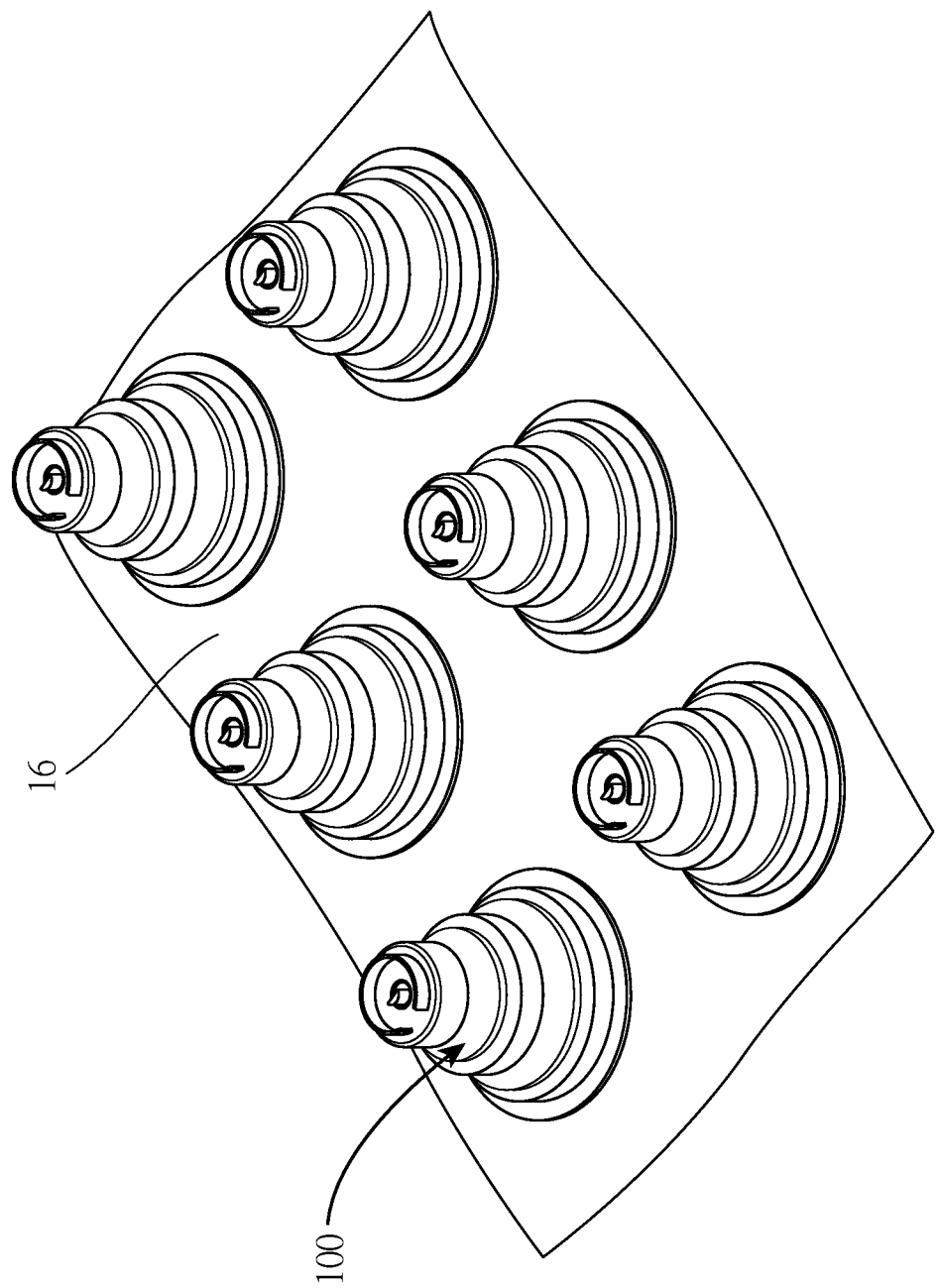
FIG. 8 is a perspective view showing a plurality of the detergent containers with a protective film sealed to each bottom.

As shown in FIG. 8 specifically, the user can carry a plurality of detergent containers 100 at the same time without the need to carry a conventional large detergent container. In turn, the purposes of reducing transportation cost from factory to consumer can be achieved as well as increasing convenience for consumers in terms of carrying and storage.

While the invention has been described in terms of preferred embodiments, those skilled in the art will recognize that the invention can be practiced with modifications within the spirit and scope of the appended claims.

What is claimed is:

1. A detergent container, comprising:
a reservoir including a dispensing part disposed on a top, an intermediate corrugated part, and a bottom edge part disposed on a bottom wherein a diameter of the dispensing part is less than each of a diameter of the corrugated part and a diameter of the bottom edge part so that the reservoir is tapered from bottom to top; and
a protective film attached to the bottom edge part;
wherein a middle of the dispensing part is provided with a reclosable opening, the reclosable opening is covered by a folding plate, the folding plate is formed with an edge of the reclosable opening, the folding plate includes a first part and a second part, the first part is formed with a column having a half-round section, the column includes a flat surface and an arc surface, the flat surface is located at a middle of the reclosable opening, the first part is provided with a first fold line between the arc surface and the edge of the reclosable opening, the second part is provided with a second fold line between the flat surface and the edge of the reclosable opening, and an edge of the dispensing part is provided with a baffle having an arc section.

2. The detergent container of claim 1, wherein the first fold line has a first length, the second fold line has a second length, and the second length is greater than the first length.

3. The detergent container of claim 1, wherein a thickness of the dispensing part is greater than a thickness of the folding plate, and the thickness of the folding plate is greater than each of a thickness of the first fold line and a thickness of the second fold line.

4. The detergent container of claim 1, wherein a thickness of the dispensing part and the folding plate is greater than a thickness of the first fold line and the second fold line.

5. The detergent container of claim 1, further comprising a notch provided through the baffle, the notch being disposed relative to a position of the first fold line.

6. The detergent container of claim 1, wherein a height of the baffle is greater than a height of the column.

7. The detergent container of claim 1, wherein the baffle and the reclosable opening are spaced at a predetermined distance.

8. The detergent container of claim 1, wherein the folding plate is frangible.

* * * * *